(12) United States Patent
Lee et al.

(10) Patent No.: US 9,137,515 B2
(45) Date of Patent: Sep. 15, 2015

(54) METHOD AND APPARATUS FOR PROVIDING DIGITAL BROADCASTING SERVICE WITH 3-DIMENSIONAL SUBTITLE

(75) Inventors: Dae-jong Lee, Hwaseong-si (KR); Yong-seok Jang, Hwaseong-si (KR); Bong-je Cho, Busan (KR); Jae-seung Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 597 days.

(21) Appl. No.: 13/162,976

(22) Filed: Jun. 17, 2011

(65) Prior Publication Data

US 2011/0310224 A1 Dec. 22, 2011

Related U.S. Application Data

(60) Provisional application No. 61/356,103, filed on Jun. 18, 2010.

(30) Foreign Application Priority Data

May 26, 2011 (KR) .................. 10-2011-0050192

(51) Int. Cl.
*H04N 13/00* (2006.01)
*H04N 7/088* (2006.01)
*H04N 21/488* (2011.01)

(52) U.S. Cl.
CPC ........... *H04N 13/007* (2013.01); *H04N 7/0885* (2013.01); *H04N 13/0059* (2013.01); *H04N 21/4884* (2013.01)

(58) Field of Classification Search
None
See application file for complete search history.

(56) References Cited

U.S. PATENT DOCUMENTS

| 2002/0006271 | A1 | 1/2002 | Winter et al. |
| 2005/0008347 | A1 | 1/2005 | Jung et al. |
| 2005/0169607 | A1 | 8/2005 | Yoo et al. |
| 2006/0059192 | A1* | 3/2006 | Chun et al. ............. 707/103 R |
| 2006/0170819 | A1* | 8/2006 | Lim et al. ................ 348/385.1 |

(Continued)

FOREIGN PATENT DOCUMENTS

| CN | 1954606 A | 4/2007 |
| CN | 101578887 A | 11/2009 |

(Continued)

OTHER PUBLICATIONS

Communication dated Jan. 19, 2012 issued by the International Searching Authority in International Patent Application No. PCT/KR2011/004442.

(Continued)

*Primary Examiner* — Christopher S Kelley
*Assistant Examiner* — Kaitlin A Retallick
(74) *Attorney, Agent, or Firm* — Sughrue Mion, PLLC

(57) ABSTRACT

A method and an apparatus for transmitting and receiving a broadcasting stream for providing a digital broadcasting service including a subtitle service are provided. A method of transmitting a data stream includes: generating a subtitle stream including basic viewpoint subtitle data and additional viewpoint subtitle data to reproduce a three-dimensional (3D) subtitle on a video screen on which video data is reproduced; determining 3D subtitle reproduction information for forming the 3D subtitle on the video screen based on the basic viewpoint subtitle data; and outputting a data stream by multiplexing a video stream including the video data, the 3D subtitle reproduction information, and the subtitle stream.

28 Claims, 10 Drawing Sheets

(56) References Cited

U.S. PATENT DOCUMENTS

| | | |
|---|---|---|
| 2007/0280644 A1 | 12/2007 | Seo et al. |
| 2008/0024501 A1* | 1/2008 | Yamakado et al. ........... 345/443 |
| 2009/0324202 A1* | 12/2009 | Okubo et al. ................... 386/95 |
| 2010/0098389 A1* | 4/2010 | Shimada ......................... 386/52 |
| 2010/0157025 A1* | 6/2010 | Suh et al. ........................ 348/51 |
| 2010/0188572 A1* | 7/2010 | Card ............................. 348/468 |
| 2010/0215347 A1* | 8/2010 | Ikeda et al. ................... 386/108 |
| 2011/0007131 A1* | 1/2011 | Okada et al. .................... 348/42 |
| 2011/0018966 A1* | 1/2011 | Kitazato ......................... 348/43 |
| 2011/0037833 A1* | 2/2011 | Lee et al. ........................ 348/46 |
| 2011/0149036 A1* | 6/2011 | Suh et al. ........................ 348/43 |
| 2011/0279644 A1* | 11/2011 | Suh et al. ........................ 348/43 |
| 2011/0292175 A1* | 12/2011 | Suh et al. ........................ 348/43 |
| 2012/0320155 A1* | 12/2012 | Suh et al. ........................ 348/43 |
| 2014/0181884 A1 | 6/2014 | Kim et al. |

FOREIGN PATENT DOCUMENTS

| | | |
|---|---|---|
| EP | 1173032 A1 | 1/2002 |
| JP | 2002335497 A | 11/2002 |
| KR | 1020040099058 A | 11/2004 |
| WO | 2005/114998 A1 | 12/2005 |
| WO | 2010/064853 A2 | 6/2010 |

OTHER PUBLICATIONS

Communication dated Oct. 18, 2013, issued by the European Patent Office in corresponding Application No. 11795994.0.

"Digital Video Broadcasting (DVB); Specification for Service Information (SI) in DVB systems", ETSI EN 300 468 V1.11.1 (Apr. 2010), European Telecommunications Standards Institute, European Broadcasting Union, Apr. 2010, 137 total pages.

"Digital Video Broadcasting (DVB); Subtitling systems", ETSI EN 300 743 V1.3.1 (Nov. 2006), European Telecommunications Standards Institute, European Broadcasting Union, Nov. 2006, 51 total pages.

"Information technology—Generic coding of moving pictures and associated audio information: Systems", ISO/IEC 13818-1:2000(E), ISO/IEC, Dec. 1, 2000, Second edition, 174 total pages.

Communication dated Mar. 30, 2015 issued by the State Intellectual Property Office of the People's Republic of China in counterpart Chinese Application No. 201180029688.0.

* cited by examiner

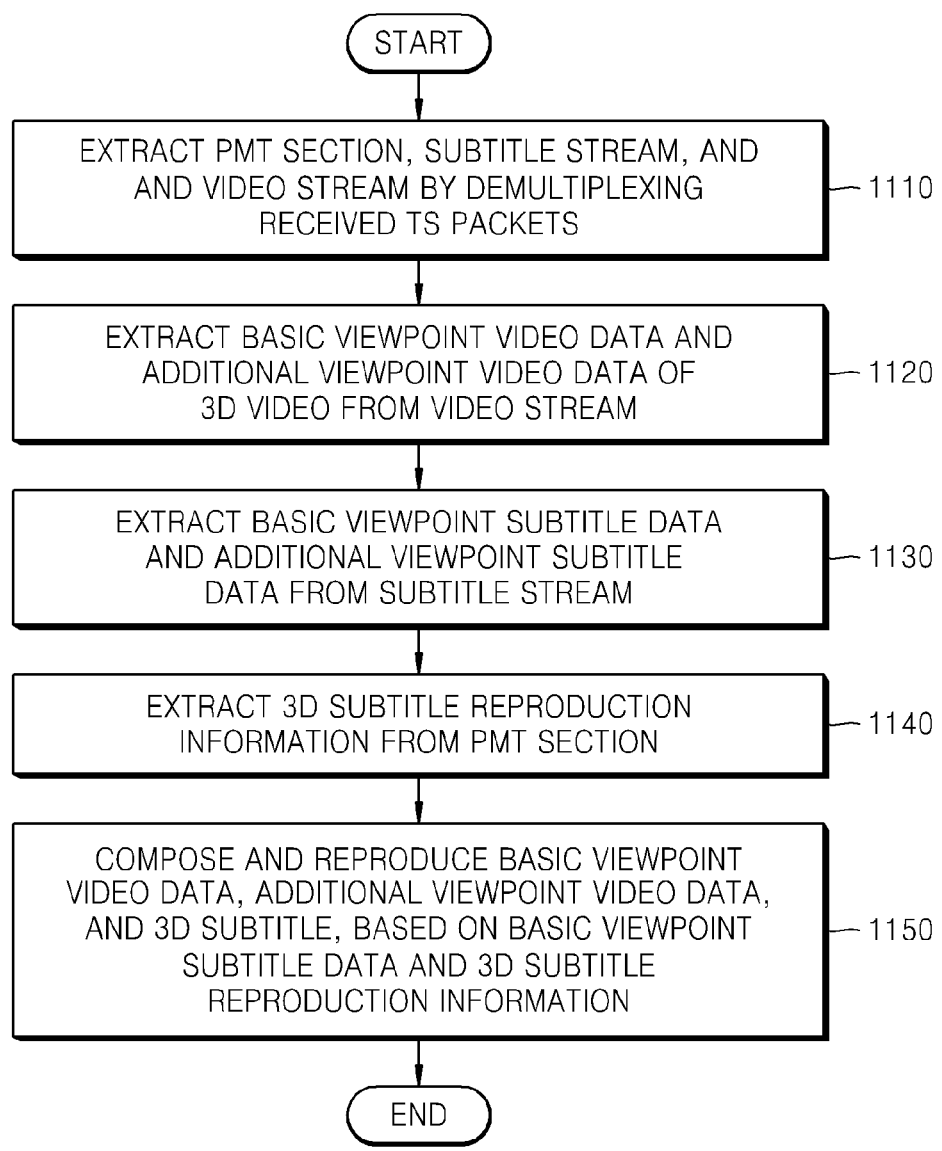

METHOD AND APPARATUS FOR PROVIDING DIGITAL BROADCASTING SERVICE WITH 3-DIMENSIONAL SUBTITLE

CROSS-REFERENCE TO RELATED PATENT APPLICATIONS

This application claims priority from Korean Patent Application No. 10-2011-0050192, filed on May 26, 2011, in the Korean Intellectual Property Office, and U.S. Provisional Application No. 61/356,103, filed on Jun. 18, 2010, in the US Patent and Trademark Office, the disclosures of which are incorporated herein in their entirety by reference.

BACKGROUND

1. Field

Methods and apparatuses consistent with exemplary embodiments relate to transmitting and receiving a broadcasting stream for providing a digital broadcasting service, and more particularly, to transmitting and receiving a broadcasting stream including a subtitle data to reproduce a three-dimensional (3D) subtitle on a video screen.

2. Description of the Related Art

A digital broadcasting system may provide a subtitle service on a video screen along with video content and audio content via a broadcast program.

A digital broadcast receiver receiving a broadcasting stream providing a digital broadcasting service restores and reproduces video content by decoding received video data. Also, the digital broadcast receiver may generate a subtitle by using subtitle data received together with the video data through the broadcasting stream, and compose the video content and the subtitle to be displayed together on a video screen.

Demands for 3D content having sense of reality and a 3D effect are increasing. Also, an amount of broadcasting content or broadcasting programs to be reproduced in 3D is increasing. A digital broadcasting receiving system that supports a 3D video may reproduce the 3D video by receiving 3D broadcasting content. Additional functions of the digital broadcasting receiving system are required to be changed according to change of reproducing method of broadcast content due to supply of 3D video broadcast content.

SUMMARY

One or more exemplary embodiments provide a method and apparatus for transmitting a digital broadcasting service, and a method and apparatus for receiving a digital broadcasting service, which transmit and receive basic viewpoint subtitle data and additional viewpoint subtitle data, which form a 3D subtitle, and 3D subtitle reproduction information for reproducing a subtitle in 3D.

According to an aspect of an exemplary embodiment, there is provided a method of transmitting a data stream for providing a digital broadcasting service, the method including: generating a subtitle stream including basic viewpoint subtitle data and additional viewpoint subtitle data to reproduce a 3D subtitle on a video screen on which video data is reproduced; determining 3D subtitle reproduction information for forming the 3D subtitle on the video screen based on the basic viewpoint subtitle data; and outputting the data stream by multiplexing a video stream including the video data, the 3D subtitle reproduction information, and the subtitle stream.

The 3D subtitle reproduction information may include page identification information about the basic viewpoint subtitle data, and 3D subtitle type information indicating a form of the 3D subtitle which is used to form the 3D subtitle based on the basic viewpoint subtitle data. The 3D subtitle reproduction information may further include at least one of page identification information about the additional viewpoint subtitle data corresponding to the basic viewpoint subtitle data, which forms the 3D subtitle together with the basic viewpoint subtitle data, and information about a distance between a basic viewpoint subtitle and an additional viewpoint subtitle on the video screen.

According to an aspect of another exemplary embodiment, there is provided a method of receiving a data stream providing a digital broadcasting service, the method including: extracting a video stream including video data, 3D subtitle reproduction information, and a subtitle stream by demultiplexing the received data stream; extracting basic viewpoint video data and additional viewpoint video data of a 3D video from the video stream; and extracting basic viewpoint subtitle data and additional viewpoint subtitle data from the subtitle stream to reproduce a 3D subtitle in 3D on a video screen on which the video data is reproduced.

The method may further include composing and reproducing the basic viewpoint video data, the additional viewpoint video data, and the 3D subtitle, based on the basic viewpoint subtitle data and the 3D subtitle reproduction information.

According to an aspect of another exemplary embodiment, there is provided an apparatus for transmitting a data stream for providing a digital broadcasting service, the apparatus including: a subtitle stream generator which generates a subtitle stream including basic viewpoint subtitle data and additional viewpoint subtitle data to reproduce a 3D subtitle on a video screen on which video data is reproduced; a 3D subtitle reproduction information determiner which determines 3D subtitle reproduction information for forming the 3D subtitle on the video screen based on the basic viewpoint subtitle data; and an output unit which outputs the data stream by multiplexing a video stream including the video data, the 3D subtitle reproduction information, and the subtitle stream.

According to an aspect of another exemplary embodiment, there is provided an apparatus for receiving a data stream providing a digital broadcasting service, the apparatus including: a receiver which extracts a video stream comprising video data, 3-dimensional (3D) subtitle reproduction information, and a subtitle stream by demultiplexing a received data stream; a video data extractor which extracts basic viewpoint video data and additional viewpoint video data of a 3D video from the video stream; and a subtitle data extractor which extracts basic viewpoint subtitle data and additional viewpoint subtitle data from the subtitle stream, so that a 3D subtitle is reproduced on a video screen on which the video data is reproduced.

The apparatus may further include a reproducer which composes and reproduces the basic viewpoint video data, the additional viewpoint video data, and the 3D subtitle, based on the basic viewpoint subtitle data and the 3D subtitle reproduction information.

According to an aspect of another exemplary embodiment, there is provided a computer readable recording medium having recorded thereon a program for executing at least one of the methods described above.

BRIEF DESCRIPTION OF THE DRAWINGS

The above and other aspects will become more apparent by describing in detail exemplary embodiments with reference to the attached drawings, in which:

FIG. 11 is a flowchart illustrating a method of receiving a video datastream, according to an exemplary embodiment.

DETAILED DESCRIPTION OF EXEMPLARY EMBODIMENTS

Hereinafter, a method and apparatus for transmitting a video datastream providing additional information required to reproduce subtitle data in 3D to reproduce a subtitle in 3D, and a method and apparatus for receiving a video data stream for reproducing a subtitle in 3D by using subtitle data provided with video data via a received data stream, and additional information for reproducing a subtitle in 3D will be described with reference to FIGS. 1 through 11. The embodiments described herein are only exemplary and are not intended to limit the inventive concept.

Figure 1:
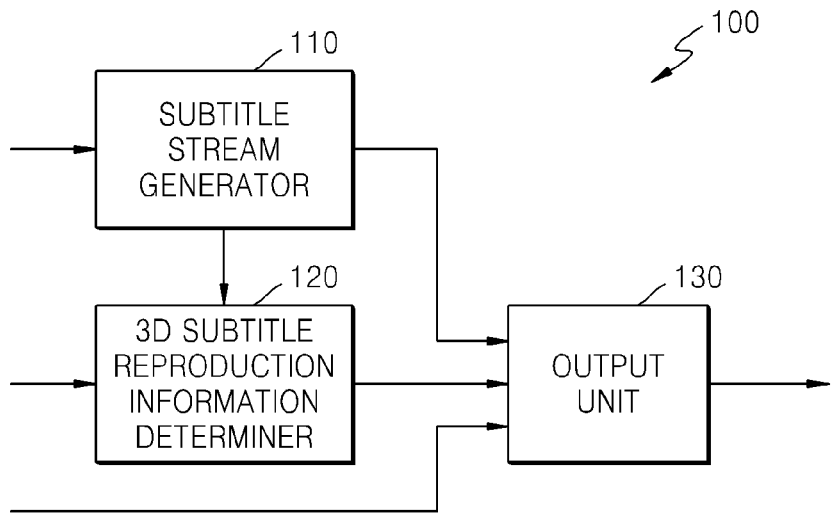
FIG. 1 is a block diagram of an apparatus for transmitting a video data stream, according to an exemplary embodiment.

FIG. 1 is a block diagram of an apparatus 100 for transmitting a video data stream, according to an exemplary embodiment.

The apparatus 100 includes a subtitle stream generator 110, a 3D subtitle reproduction information determiner 120, and an output unit 130.

At least one of the subtitle stream generator 110, the 3D subtitle reproduction information determiner 120, and the output unit 130 may be operated by using a self-processor or control apparatus, or a central processor or central control apparatus installed to the apparatus 100 or connected to an external device.

The apparatus 100 may transmit a broadcasting stream including video data, audio data, and additional data, so as to provide a digital broadcasting service. The apparatus 100 according to an embodiment may transmit a video data stream including 3D video data as a broadcasting stream to provide a digital broadcasting service providing a 3D video service.

The apparatus 100 may generate and output a video data stream according to a Digital Video Broadcasting (DVB) method constituting a digital broadcasting standard. The apparatus 100 may provide a subtitle service by using a subtitle employed by the DVB method.

In order to provide the subtitle service, in which a text, a logo, and other graphic elements are reproduced on a video screen, the apparatus 100 may transmit subtitle data, in which the text, logo, other graphic objects and subtitle elements are encoded.

The apparatus 100 may transmit a subtitle stream including the subtitle data. The subtitle stream may be a data region of an elementary stream or transport packet.

A page is used as a unit of a set of subtitle objects forming a predetermined subtitle service. One page may be formed of at least one region, and each region may be a rectangular region in which objects are located. A text object, a logo object, and other graphic objects of a subtitle may be located in one region, and the region may include a plurality of objects. One subtitle service may be continuously displayed on at least one page.

Subtitle data inserted into a subtitle stream may be divided into at least one subtitle segment. Subtitle data included in each subtitle segment may include not only object data of subtitle objects, but also subtitle elements, such as region information, region structure, and color look-up table (CLUT) information.

The apparatus 100 may provide a 3D subtitle service for reproducing a subtitle in 3D on a video screen that provides a 3D video broadcasting service.

The subtitle stream generator 110 may generate a subtitle stream including basic viewpoint subtitle data and additional viewpoint subtitle data to reproduce a subtitle in 3D on a video screen on which video data is reproduced.

The 3D subtitle reproduction information determiner 120 may determine 3D subtitle reproduction information constituting additional information required for a video reproducing device to form a 3D subtitle on the video screen based on the basic viewpoint subtitle data.

The subtitle stream generator 110 may generate one subtitle stream to include both of the basic viewpoint subtitle data and the additional viewpoint subtitle data. Alternatively, the subtitle stream generator 110 may generate each of a first subtitle stream including the basic viewpoint subtitle data and a second subtitle stream including the additional viewpoint subtitle data.

For the 3D subtitle, a first subtitle page including the basic viewpoint subtitle data may be formed, and a second subtitle page including the additional viewpoint subtitle data may be formed.

The 3D subtitle reproduction information may include page identification information about the basic viewpoint subtitle data. For example, the page identification information about the basic viewpoint subtitle data may indicate a page of the basic viewpoint subtitle data to be composed with left viewpoint video data from among the 3D subtitle, and may correspond to the basic viewpoint subtitle data.

The 3D subtitle reproduction information may include 3D subtitle type information indicating a form of the 3D subtitle which is used to form the 3D subtitle based on the basic viewpoint subtitle data. For example, the 3D subtitle type information may indicate two subtitle types. A first subtitle type may indicate a form of the 3D subtitle using the basic viewpoint subtitle data and information about a distance between a basic viewpoint subtitle and an additional viewpoint subtitle. A second subtitle type may indicate a form of the 3D subtitle using the basic viewpoint subtitle data and the additional viewpoint subtitle data.

The 3D subtitle reproduction information may include at least one of page identification information about the additional viewpoint subtitle data, which corresponds to the basic viewpoint subtitle data and forms the 3D subtitle together with the basic viewpoint subtitle data, and the information about the distance between the basic viewpoint subtitle and the additional viewpoint subtitle on the video screen.

The information about the distance between the basic viewpoint subtitle and the additional viewpoint subtitle may include information about a direction of the distance between the basic viewpoint subtitle and the additional viewpoint subtitle, and information about a location difference between the basic viewpoint subtitle and the additional viewpoint subtitle. The location difference information may indicate at least one of a depth difference, a disparity difference, and an offset.

The 3D subtitle reproduction information determiner 120 may insert the 3D subtitle reproduction information into a descriptor region of a program map table (PMT) section.

The 3D subtitle reproduction information determiner 120 may selectively include one of the page identification information about the additional viewpoint subtitle data and the information about the distance between the basic viewpoint subtitle and the additional viewpoint subtitle to the 3D subtitle reproduction information, according to the 3D subtitle type information from among the 3D subtitle reproduction information.

For example, if a current 3D subtitle type is the first subtitle type, the 3D subtitle reproduction information may not include the page identification information about the additional viewpoint subtitle data since the additional viewpoint subtitle data may not be separately detected. On the other hand, if the current 3D subtitle type is the second subtitle type, the 3D subtitle reproduction information may not include the distance information since the basic viewpoint subtitle data and the additional viewpoint subtitle data are separately transmitted.

In the 3D subtitle reproduction information determiner 120, the 3D subtitle reproduction information may include both of the page identification information about the additional viewpoint subtitle data and the distance information, regardless of the 3D subtitle type information.

According to an exemplary embodiment, the apparatus 100 and a video reproducing device may transmit and receive explicit information indicating a reproduction priority from among the first subtitle type and the second subtitle type.

For example, the apparatus 100 may output reproduction information having higher priority from among the page identification information about the additional viewpoint subtitle data and the distance information.

Alternatively, if the apparatus 100 transmits both of the page identification information about the additional viewpoint subtitle data and the distance information, a method of determining a subtitle type having reproduction priority may be pre-determined between the apparatus 100 and the video reproducing device so that one of the page identification information about the additional viewpoint subtitle data and the distance information may be employed by the video reproducing device based on current 3D subtitle type information or based on capability of the video reproducing device.

The output unit 130 may insert the 3D subtitle reproduction information into the PMT section, and outputs a transport stream (TS) packet including the PMT section, the subtitle stream, and the video stream.

The PMT section may include packet identification (PID) information indicating a packetized elementary stream (PES) packet including the subtitle data. Since at least one subtitle stream may be transmitted, the PMT section may include at least one piece of PID information according to a number of subtitle streams.

The output unit 130 may generate the PES packet by packetizing the subtitle stream and the video stream, and generate TS packets by multiplexing the PES packets and PMT section. The output unit 130 may output and transmit the TS packets via a predetermined channel.

Accordingly, the apparatus 100 may separately transmit the basic viewpoint subtitle data and the additional viewpoint subtitle data for forming the 3D subtitle to be reproduced with a 3D video to form the 3D subtitle together with the 3D video service provided by DVB systems. Also, the apparatus 100 may transmit additional information indicating corresponding additional viewpoint subtitle data or additional information indicating a distance between the basic viewpoint subtitle and the additional viewpoint subtitle to form the 3D subtitle based on the basic viewpoint subtitle data.

Figure 2:
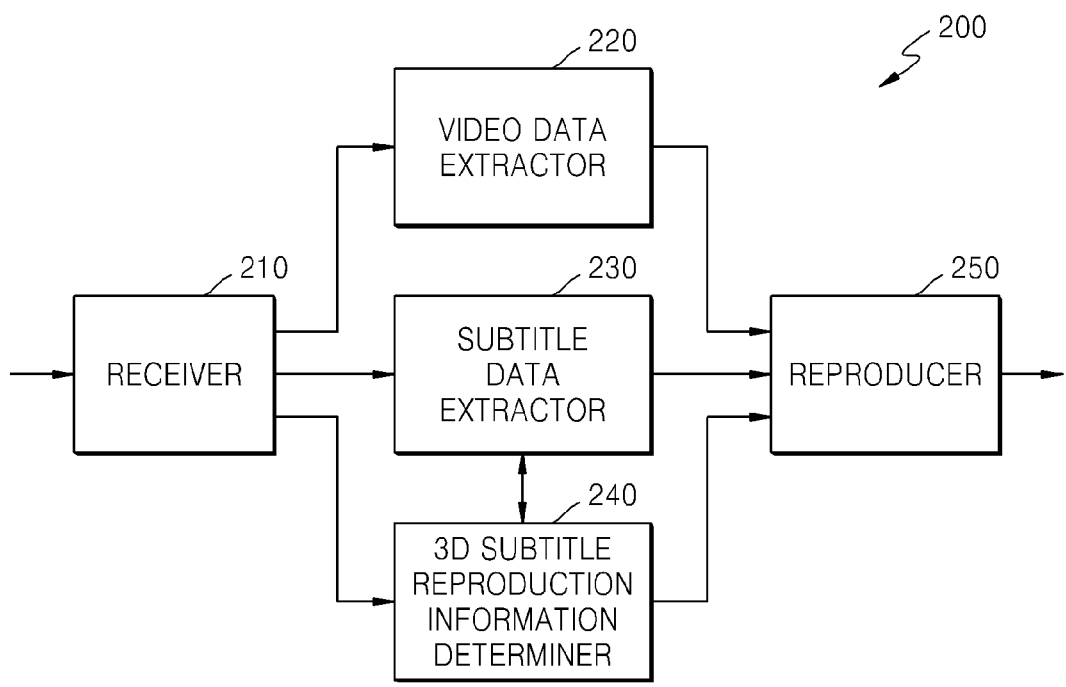
FIG. 2 is a block diagram of an apparatus for receiving a video data stream, according to an exemplary embodiment.

FIG. 2 is a block diagram of an apparatus 200 for receiving a video data stream, according to an exemplary embodiment.

The apparatus 200 includes a receiver 210, a video data extractor 220, a subtitle data extractor 230, a 3D subtitle reproduction information extractor 240, and a reproducer 250.

At least one of the receiver 210, the video data extractor 220, and the subtitle data extractor 230 may be operated by using a self-processor or control apparatus, or a central processor or central control apparatus installed to the apparatus 200 or connected to an external device.

The apparatus 200 may receive a broadcasting stream providing a digital broadcasting service, and extract video data, audio data, and additional data from the broadcasting stream. The apparatus 200 may reproduce a broadcast media by using the extracted video data, audio data, and additional data.

The apparatus 200 may receive the broadcasting stream providing the 3D video service, and reproduce 3D video by extracting 3D video data.

The apparatus 200 may receive a video data stream distributed by DVB systems. The apparatus 200 may receive a subtitle provided for a DVB subtitle service.

The apparatus 200 may receive subtitle data, in which a text, a logo, other graphic objects, and subtitle elements are encoded, form a video screen by composing the subtitle data with video data, and reproduce the text, the logo, and other graphic objects on the video screen.

The apparatus 200 may extract the subtitle data from the subtitle stream from among the received broadcasting stream.

The apparatus 200 may read a set of subtitle objects forming a predetermined subtitle service for each page of the subtitle data. The apparatus 200 may detect objects, such as a text object, a logo object, and other graphic objects of the subtitle from a subtitle page, and detect a location of at least one object region. The apparatus 200 may dispose at least one object in each object region, and dispose at least one object region in each subtitle page.

The apparatus 200 may reproduce one subtitle service on a continuous page by using at least one page.

The apparatus 200 may read subtitle data divided into at least one subtitle segment, from the subtitle stream. Object data of subtitle objects and subtitle elements, such as region information, region structure, and CLUT information, may be extracted from each subtitle segment.

The apparatus 200 may realizes a 3D subtitle service on the video screen on which a 3D video is reproduced, by receiving a broadcasting stream for a 3D video broadcasting service.

The receiver 210 may receive TS packets of the broadcasting stream for the 3D video broadcasting service. The receiver 210 may demultiplex the TS packets to extract a video stream including video data, a PMT section and a subtitle stream.

The video data extractor 220 may extract basic viewpoint video data and additional viewpoint video data of a 3D video from the video stream.

The subtitle data extractor 230 may extract basic viewpoint subtitle data and additional viewpoint subtitle data for forming a 3D subtitle, from the subtitle stream. A 3D subtitle is formed based on the basic viewpoint subtitle data and the additional viewpoint subtitle data, and the 3D subtitle may be reproduced on the video screen on which the 3D video is reproduced.

The subtitle stream may be received in a bitstream form of a data region of an elementary stream or PES packet. Accordingly, the subtitle data may be extracted from PES packet data or the elementary stream.

The 3D subtitle reproduction information extractor 240 may extract 3D subtitle reproduction information for forming the 3D subtitle on the video screen based on the basic viewpoint subtitle data, from the PMT section.

The receiver 210 may receive TS packets via a predetermined channel, demultiplex the received TS packets, and rearrange the PES packets and PMT section.

The PMT section may include PID information indicating a PES packet of a video stream including the video data, and a PES packet of a subtitle stream including the subtitle data.

The video data extractor 220 may detect the PES packets including the video stream and reconstruct the video stream based on the PID information of the PMT section.

The subtitle data extractor 230 may detect the PES packets including the subtitle stream and rearrange the subtitle stream based on the PID information of the PMT section.

The 3D subtitle reproduction information extractor 240 may extract 3D subtitle reproduction information from the PMT section.

The reproducer 250 may compose and reproduce the basic viewpoint video data, the additional viewpoint video data, and the 3D subtitle based on the basic viewpoint subtitle data and the 3D subtitle reproduction information.

The reproducer 250 may separately form a first page for displaying basic viewpoint subtitle objects based on the basic viewpoint subtitle data, and form a second page for displaying additional viewpoint subtitle objects based on the additional viewpoint subtitle data.

The subtitle data extractor 230 may extract both of the basic viewpoint subtitle data and the additional viewpoint subtitle data from one subtitle stream. Alternatively, the subtitle data extractor 230 may extract the basic viewpoint subtitle data identified by the first page from a first subtitle stream, and the additional viewpoint subtitle data identified by the second page form a second subtitle stream.

The 3D subtitle reproduction information extractor 240 may extract page identification information about the basic viewpoint subtitle data from the 3D subtitle reproduction information. The 3D subtitle reproduction information extractor 240 may detect the basic viewpoint subtitle data from the PES packet or subtitle stream from among received streams, based on page identification information about the basic viewpoint subtitle data.

The 3D subtitle reproduction information extractor 240 may extract 3D subtitle type information from the 3D subtitle reproduction information. The 3D subtitle reproduction information extractor 240 may determine a form of the 3D subtitle based on the basic viewpoint subtitle data, based on the 3D subtitle type information.

The 3D subtitle type information corresponds to the 3D subtitle type information received from the apparatus 100 as shown in FIG. 1. Accordingly, the 3D subtitle reproduction information extractor 240 may determine a current 3D subtitle to be one of the first subtitle type and the second subtitle type, based on the 3D subtitle type information.

The subtitle data extractor 230 may extract the basic viewpoint subtitle data based on the 3D subtitle reproduction information. Also, the 3D subtitle reproduction information extractor 240 may extract additional information for determining an additional viewpoint subtitle corresponding to a basic viewpoint subtitle, so as to form the 3D subtitle.

The 3D subtitle reproduction information extractor 240 may detect at least one of page identification information about the additional viewpoint subtitle data corresponding to the basic viewpoint subtitle data, and information about a distance between the basic viewpoint subtitle and the additional viewpoint subtitle on the video screen, as the additional information for determining the additional viewpoint subtitle.

The 3D subtitle reproduction information extractor 240 may detect information about a direction of a distance between the basic viewpoint subtitle and the additional viewpoint subtitle, and location difference information indicating at least one of a depth difference between the basic viewpoint subtitle and the additional viewpoint subtitle, a disparity difference, and an offset, from the distance information.

The 3D subtitle reproduction information extractor 240 may selectively extract one of the page identification information about the additional viewpoint subtitle data and the distance information, based on the 3D subtitle type information.

For example, if a current 3D subtitle is read to be the first subtitle type based on the 3D subtitle type information, the 3D subtitle reproduction information extractor 240 may selectively extract the distance information from the 3D subtitle reproduction information.

If the current 3D subtitle is read to be the second subtitle type based on the 3D subtitle type information, the 3D subtitle reproduction information extractor 240 may extract the page identification information about the additional viewpoint subtitle data from the 3D subtitle reproduction information.

The 3D subtitle reproduction information extractor 240 may detect both of the page identification information about the additional viewpoint subtitle data and the distance information from the 3D subtitle reproduction information.

If both of the first and second subtitle types are realizable, the apparatus 100 and the apparatus 200 may transmit and receive reproduction priority information designating a subtitle type to be employed first.

Alternatively, a subtitle type to be employed first may be pre-determined between the apparatuses 100 and 200. Alternatively, the apparatus 200 may employ a predetermined subtitle type first based on video capability.

The 3D subtitle reproduction information extractor 240 may extract additional information corresponding to a subtitle type employed first from the 3D subtitle reproduction information, and determine the additional viewpoint subtitle data based on the additional information.

The 3D subtitle reproduction information extractor 240 may detect the 3D subtitle reproduction information from the PMT section. The 3D subtitle reproduction information extractor 240 may extract a 3D subtitle descriptor from a descriptor region of the PMT section, and detect the page identification information about the basic viewpoint subtitle data, the subtitle type information, and the additional information for determining the additional viewpoint subtitle, from the 3D subtitle descriptor.

The reproducer 250 may form a basic viewpoint video screen by composing the basic viewpoint subtitle data and the basic viewpoint video data, and form an additional viewpoint video screen by composing the additional viewpoint subtitle data and the additional viewpoint video data.

Specifically, the reproducer 250 may compose the additional viewpoint video data with the additional viewpoint subtitle data determined based on the 3D subtitle reproduction information.

For example, if the 3D subtitle reproduction information extractor 240 determines that the current 3D subtitle is the first subtitle type based on the 3D subtitle type information, the reproducer 250 may determine a location of the additional viewpoint subtitle data by using the distance information from among the 3D subtitle reproduction information. The reproducer 250 may form an additional viewpoint video screen composed with the additional viewpoint subtitle by disposing the basic viewpoint subtitle data in the location of the additional viewpoint subtitle data on the additional viewpoint video screen.

For example, if the 3D subtitle reproduction information extractor 240 determines that the current 3D subtitle is the second subtitle type based on the 3D subtitle type information, the reproducer 250 may determine and extract the additional viewpoint subtitle data corresponding to the basic viewpoint subtitle data, based on the page identification information about the additional viewpoint subtitle data from among the 3D subtitle reproduction information. The reproducer 250 may form the additional viewpoint video screen by composing the extracted additional viewpoint subtitle data with the additional viewpoint video data.

The reproducer 250 may realize the 3D video service providing the 3D subtitle service by alternately reproducing the basic viewpoint video screen composed with the basic viewpoint subtitle, and the additional viewpoint video screen composed with the additional viewpoint subtitle.

Accordingly, the apparatus 200 may receive the broadcasting stream providing the 3D video service based on the DVB method to separately receive the basic viewpoint subtitle data and the additional viewpoint subtitle data for forming the 3D subtitle together with the 3D video data.

Also, the apparatus 200 may receive additional information indicating the additional viewpoint subtitle data corresponding to the basic viewpoint subtitle data, or additional information indicating a distance between the basic viewpoint subtitle and the additional viewpoint subtitle to determine the corresponding basic viewpoint subtitle data and additional viewpoint subtitle data.

The apparatus 200 may compose the basic viewpoint video data and the basic viewpoint subtitle data for reproducing the 3D video, and composes the additional viewpoint video data and the additional viewpoint subtitle data, thereby reproducing the 3D subtitle while reproducing the 3D video.

Hereinafter, a data structure including 3D subtitle data, according to an exemplary embodiment, and syntax of 3D subtitle reproduction information, according to an exemplary embodiment, will be described with reference to FIGS. 3 through 9.

A basic data block of a DVB subtitle stream is a subtitle segment. The subtitle segment is transmitted via a PES packet, and the PES packet is transmitted via a TS packet. A number of subtitle segments transmitted via one PES packet may be limited by a maximum length of the PES packet.

The subtitle stream may be transmitted via a TS packet identified by the same PID information.

One subtitle stream may include a plurality of subtitle services, but all pieces of subtitle data required for each subtitle service may be transmitted via one subtitle stream.

The plurality of subtitle services transmitted via one subtitle stream may be subtitle services of different languages for one program, or subtitle services for different programs.

A subtitle page may include a subtitle segment. Page identification information may be assigned to each subtitle segment in a subtitle stream. Each subtitle segment may include predetermined data about one subtitle service, or common data shared by at least one subtitle service.

Accordingly, the subtitle page may be classified into a composition page and an ancillary page. The composition page corresponds to a subtitle segment including subtitle data of the corresponding subtitle service. The ancillary page corresponds to a subtitle segment including common data of subtitle services included in a current subtitle stream.

A descriptor region of a PMT section may include a subtitle descriptor. A subtitle descriptor of each subtitle service transmits page identification information about a subtitle segment required to decode a corresponding subtitle service. The page identification information about the subtitle segment may be linked with page identification information about subtitle data transmitted by a subtitle stream.

The subtitle descriptor transmits identification information 'composition-page_id' of the composition page and identification information 'ancillary-page_id' of the ancillary page of each subtitle service. For example, segment data for transmitting a common logo in subtitles in several languages may be transmitted by using the page identification information about the ancillary page.

Also, the subtitle segment may be classified into a resolution segment, a page composition segment, a region composition segment, a CLUT definition segment, an object data segment, and an end of display set segment, according to subtitle data of an included subtitle service.

In other words, resolution information about a corresponding subtitle service, composition information about a subtitle page including a list of at least one region forming the subtitle page, a spatial location of the at least one region, partial timeout information about the subtitle page, and a page state, information about a region composition, information about a region attribute using CLUT, such as length and width size of a region, a background color, and a depth, information about a list of objects included in a region and locations of the objects, information about a predetermined CLUT, information about a graphic object or a text object, and information notifying end of a subtitle segment may be transmitted and received by using the subtitle segment.

First, a data structure transmitting a DVB subtitle and syntax of a PMT section including information about a subtitle will be described with reference to FIGS. 3 through 6.

Figure 3:
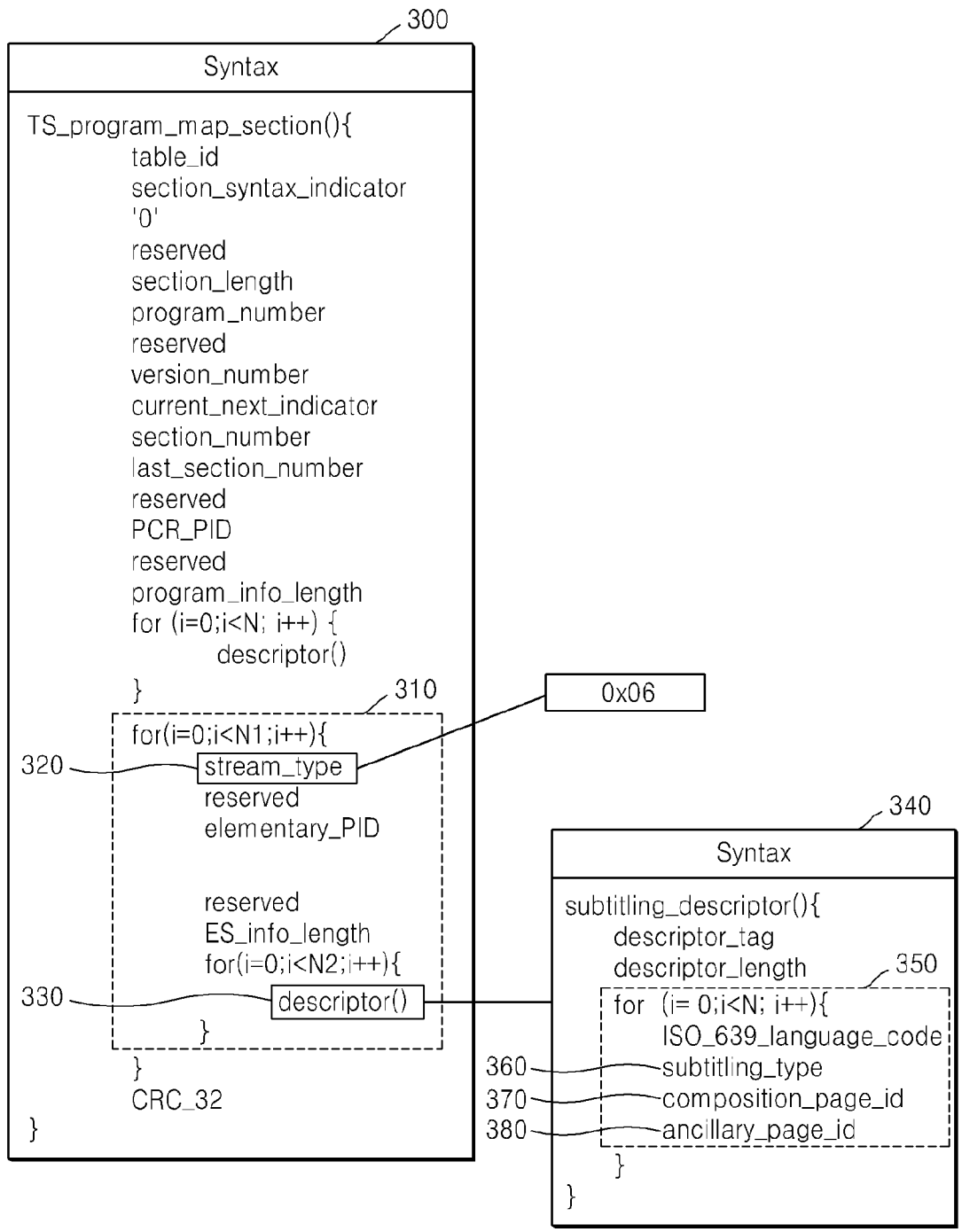
FIG. 3 shows a syntax of a program map table (PMT) section, and a syntax of a subtitle descriptor for general reproduction of a subtitle, according to an exemplary embodiment.

FIG. 3 shows syntax of a PMT section 300, and a syntax of a subtitle descriptor for general reproduction of a subtitle, according to an exemplary embodiment.

The apparatus 100 as shown in FIG. 1 may transmit TS packets generated by packetizing and multiplexing a stream including video data, audio data, and additional data, so as to transmit video, audio, and additional information provided via a broadcasting service through a broadcasting stream.

The PMT section 300 according to a DVB method contains information about a video stream, an audio stream, and other streams included in a current broadcasting stream. The apparatus 100 multiplexes the PMT section 300 with a PES packet to generate TS packets for providing a digital broadcasting service.

In order to provide a subtitle service according to a DVB method, subtitle elements, such as object data and region information, may be included in and transmitted with a subtitle stream from among other streams. The PMT section 300 according to the DVB method may include information about a subtitle stream.

For example, information about each stream may be transmitted via a for loop 310 in the PMT section 300. A 'stream_type' field 320 may include stream type information about a predetermined stream.

For example, when a current elementary stream indicated by an elementary stream identifier 'elementary_PID' is a subtitle stream, a value of the 'stream_type' field 320 is '0x06', and a 'descriptor( )' region 330 may include a 'subtitling_descriptor( )' descriptor 340 including information about a current subtitle stream.

Information about at least one subtitle service included in the current subtitle stream may be transmitted according to subtitle services through a for loop 350 of the 'subtitling_descriptor( )' descriptor 340.

A 'ISO_639_language_code' field 360 indicates a language code of a subtitle provided by a current subtitle service. An 'ancillary_page_id' field 380 indicates identification information about the ancillary page containing not only the current subtitle service but also common information for subtitle services provided through the current subtitle stream.

One subtitle service may correspond to one subtitle page. A 'composition_page_id' field 370 indicates composition page identification information about the current subtitle service, and may signal predetermined subtitle data for providing the current subtitle service. Accordingly, at least one piece of subtitle data included in the current subtitle stream may be identified based on the 'composition_page_id' field 370.

Subtitle data included in a subtitle stream is contained in a page form and may be identified based on intrinsic page identification information. For example, the apparatus 200 as shown in FIG. 2 detects subtitle data having page identification information corresponding to composition page identification information about the 'composition_page_id' field 370 of the PMT section 300 from among the subtitle data of the subtitle stream, thereby forming and reproducing a subtitle.

Figure 4:
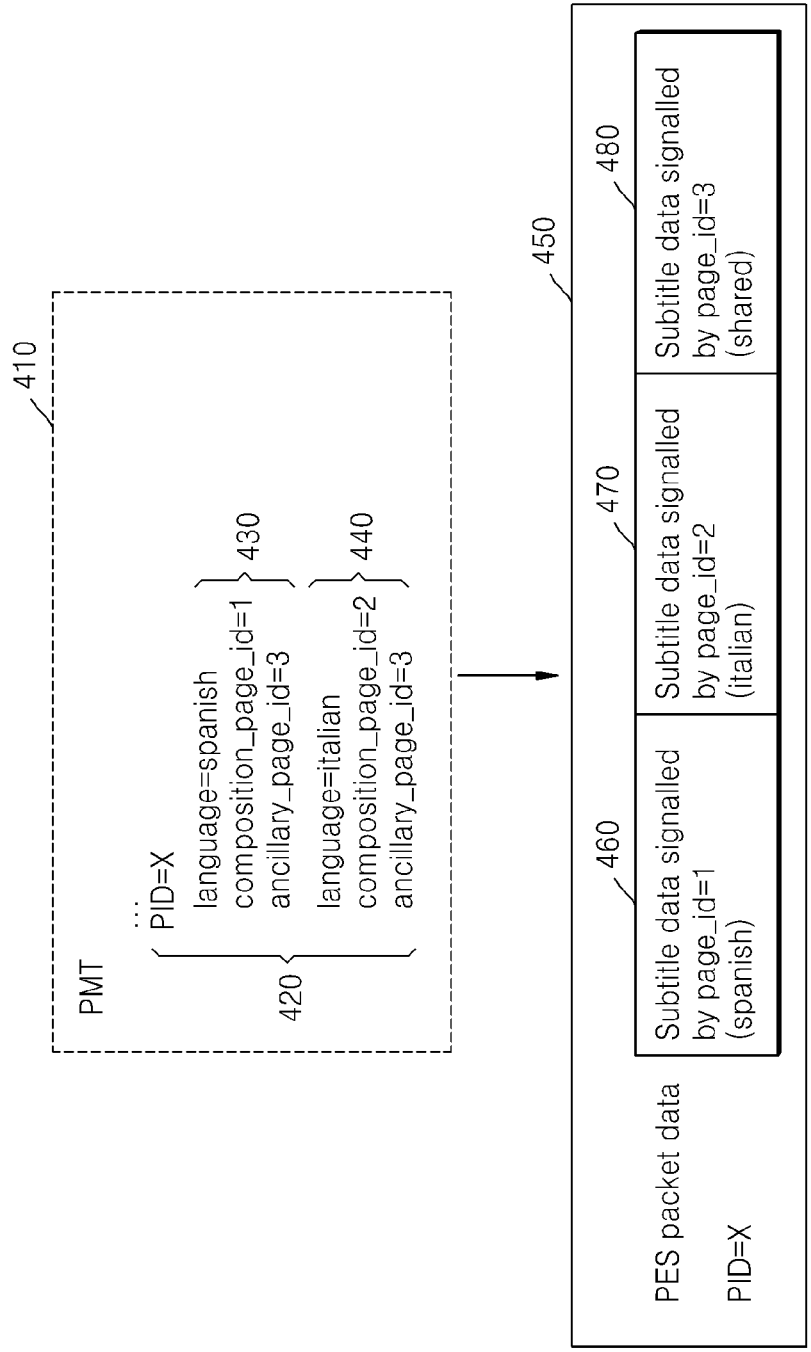
FIGS. 4 and 5 show a link between a subtitle descriptor and subtitle data, according to exemplary embodiments.
Figure 5:
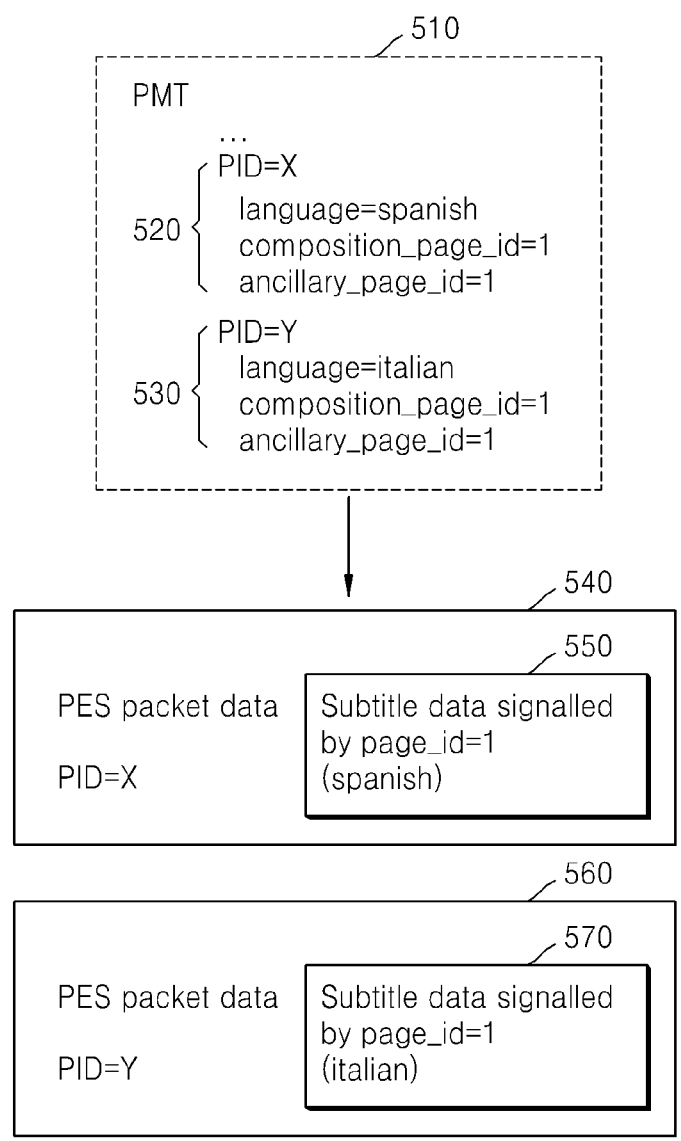

FIGS. 4 and 5 show a link between a subtitle descriptor and subtitle data, according to exemplary embodiments.

Referring to FIG. 4, a PMT section 410 may include a subtitle descriptor including subtitle related information about a subtitle stream. A subtitle descriptor 420 in the PMT section 410 includes information about at least one subtitle service included in the same subtitle stream.

According to the subtitle descriptor 420, subtitle data is transmitted by a PES packet 450 having a stream identification information 'PID' value of X. Also, the subtitle descriptor 420 may include information 430 and 440 about a subtitle service according to subtitle pages.

The subtitle descriptor 420 may include subtitle language information 'language', composition page identification information 'composition-page_id', and ancillary page identification information 'ancillary-page_id', according to subtitle services.

Accordingly, the apparatus 200 may extract a subtitle stream by detecting the PES packet 450 having the stream identification information value of X from a received data stream, by using the subtitle descriptor 420 in the PMT section 410.

Alternatively, the apparatus 200 may detect first subtitle data 460 included in a composition page, wherein a subtitle language is 'spanish' and a composition page identification information value is 1, or second subtitle data 470 included in a composition page, wherein a subtitle language is 'italian' and a subtitle page identification information value is 2, by using the subtitle descriptor 420 in the PMT section 410.

Alternatively, the apparatus 200 may detect an ancillary page 480, wherein a page identification information value is 3 and common information of subtitle services in the same subtitle stream is included, based on ancillary page identification information in the subtitle descriptor 420.

Referring to FIG. 5, first and second subtitle descriptors 520 and 530 in a PMT section 510 include information about a subtitle service included in different subtitle streams. The PMT section 510 transmits first and second subtitle descriptors 520 and 530 respectively including stream identification information X and Y.

Accordingly, the apparatus 200 extracts a first subtitle stream 540 having a stream identification information value of X from a current received data stream, based on the first subtitle descriptor 520 of the PMT section 510. Also, the apparatus 200 may detect a second subtitle stream 560 having a stream identification information value of Y from the current received data stream, based on the second subtitle descriptor 530.

The apparatus 200 may detect first subtitle data 550, in which a subtitle language is 'spanish' and subtitle page identification information value is 1, from the first subtitle stream 540, by using the first subtitle descriptor 520 of the PMT section 510.

Also, the apparatus 200 may detect second subtitle data 570, in which a subtitle language is 'italian' and a subtitle page identification information value is 1, from the second subtitle stream 560, by using the second subtitle descriptor 530 of the PMT section 510.

Figure 6:
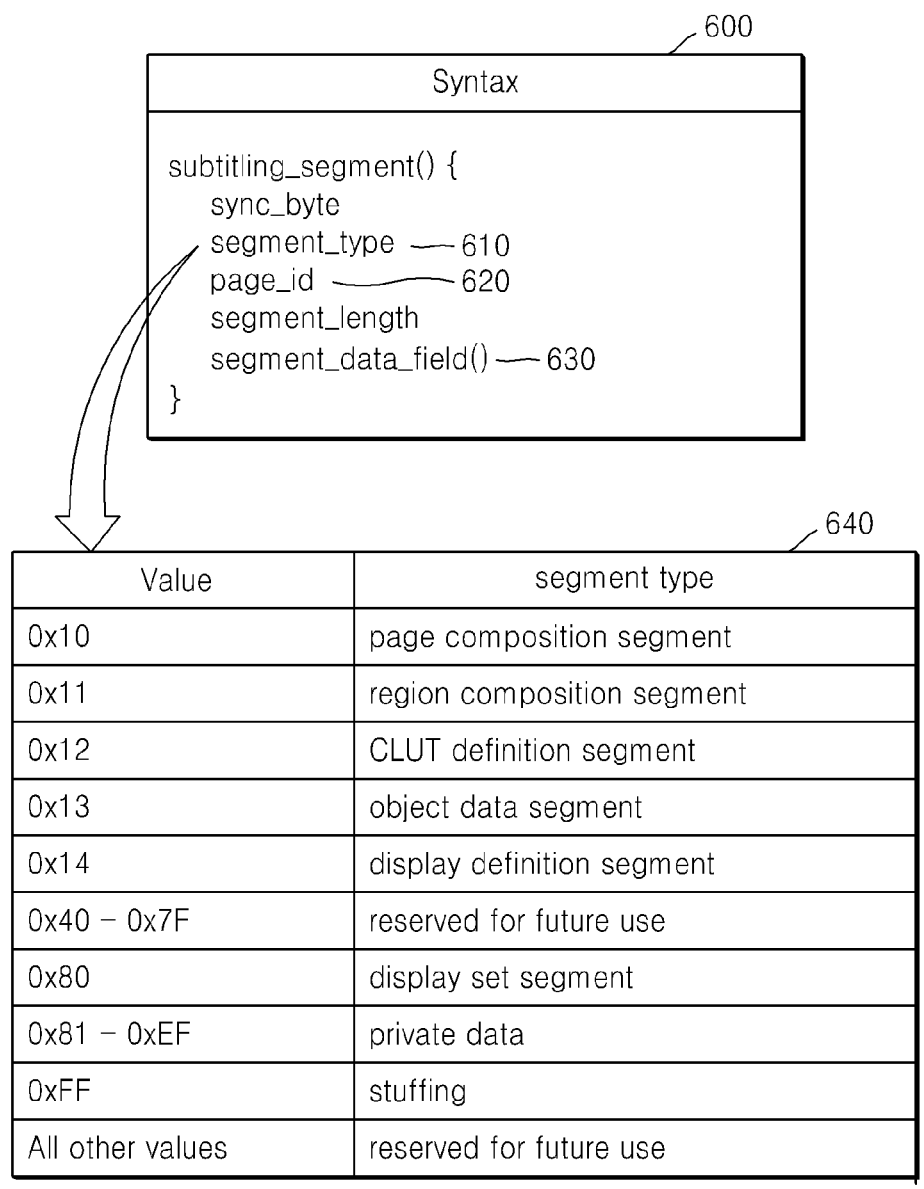
FIG. 6 shows a syntax of a subtitle segment and a semantic of segment type information, according to an exemplary embodiment.

FIG. 6 shows syntax 600 of a subtitle segment and a semantic 640 of segment type information.

Subtitle data about a subtitle service is transmitted in a form of a subtitle segment. According to the syntax 600 of the subtitle segment, a 'page_id' field 620 indicates identification information about a subtitle page corresponding to the subtitle segment. A 'segment_type' field 610 indicates a segment type of the subtitle segment. A 'segment_data_field( )' field 630 includes subtitle data forming the subtitle page.

The apparatus 200 may detect a subtitle segment having the 'page_id' field 620 having the same value as a 'composition-page_id' field of a subtitle descriptor of a PMT section by comparing the 'composition-page_id' field and the 'page_id' field 620, and extract the subtitle data from the 'segment_data_field( )' field 630.

The apparatus 200 may determine an object, such as a location of a subtitle on a video screen, a subtitle text, or a logo, based on the extracted subtitle data.

According to the semantic 640, a subtitle segment type may be determined to be one of a page composition segment, a region composition segment, a CLUT definition segment, an object data segment, a display definition segment, and an end of display set segment.

For example, the apparatus 200 may determine that a current subtitle segment is one of a page composition segment, a region composition segment, a CLUT definition segment, an object data segment, a display definition segment, and an end of display set segment, based on subtitle segment type information of the subtitle segment. Accordingly, the apparatus 200 may extract one of page composition data, region composition data, CLUT definition data, object data, display definition data, and end of display set segment data from the 'segment_data_field( )' field 630.

Accordingly, in order to selectively reproduce a Spanish subtitle, the apparatus 200 may obtain information that the subtitle page 460 or 550, which is included in the subtitle stream 450 or 540 having a stream identification information value of X and has a page identification information value of 1, includes Spanish subtitle data, based on the subtitle descriptor of the PMT section 410 or 510. Accordingly, the apparatus 200 may detect the subtitle page 460 or 550 having the page identification information value of 1 from the subtitle stream 450 or 540 having the stream identification information value of X, thereby obtaining the Spanish subtitle data and selectively reproducing a desired subtitle service.

Hereinafter, a data structure of a 3D subtitle and syntax of a 3D subtitle descriptor for providing a 3D subtitle service based on a DVB subtitle according to an exemplary embodiment will be described with reference to FIGS. 7 through 11.

Figure 7:
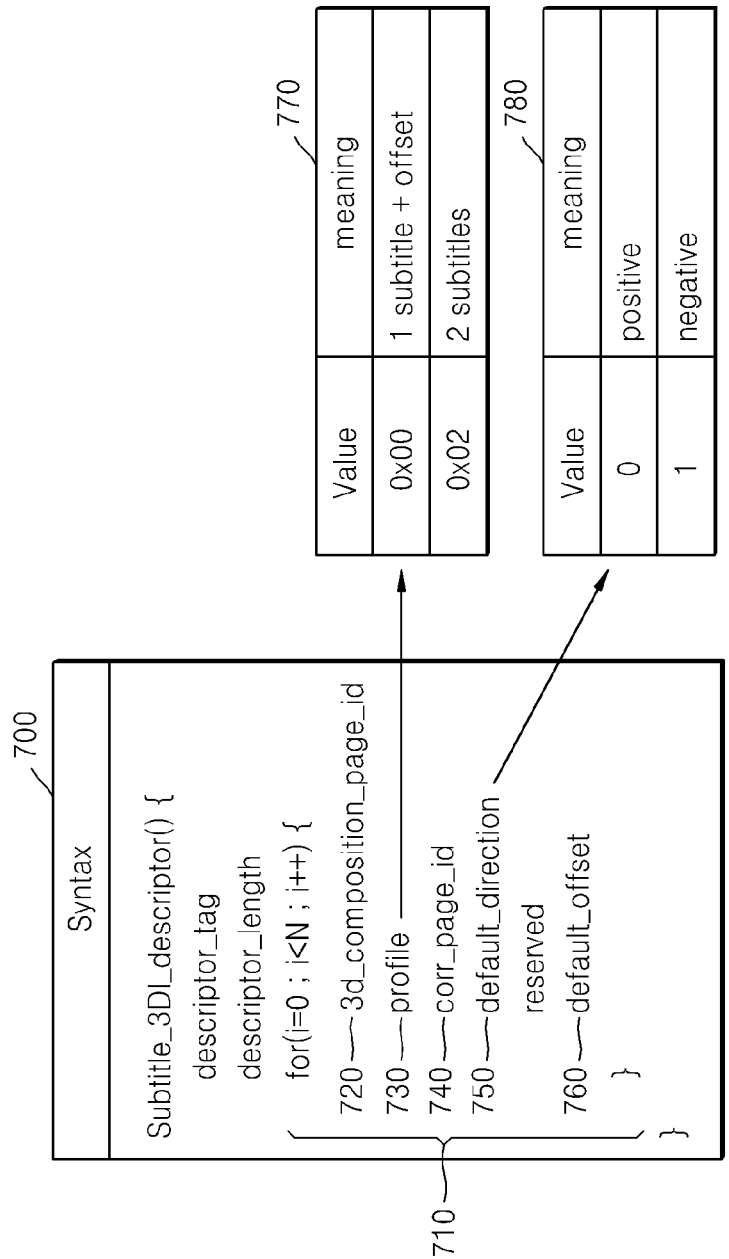
FIG. 7 shows a syntax of a 3D subtitle descriptor including 3D subtitle reproduction information, and a semantic of the 3D subtitle reproduction information, according to an exemplary embodiment.

FIG. 7 shows syntax 700 of a 3D subtitle descriptor including 3D subtitle reproduction information, and semantics 770 and 780 of the 3D subtitle reproduction information, according to an exemplary embodiment.

The apparatus 100 as shown in FIG. 1 may transmit 3D subtitle reproduction information in a descriptor form of a PMT section. A 3D subtitle descriptor 'Subtitle_3DI_descriptor' may include 3D subtitle reproduction information about each subtitle page by using a for loop 710.

For example, the 3D subtitle descriptor 'Subtitle_3DI_descriptor' includes a '3d_composition_page_id' field 720, a 'profile' field 730, a 'corr_page_id' field 740, a 'default_direction' field 750, and a 'default_offset' field 760 of each subtitle page, as 3D subtitle reproduction information for a current 3D subtitle service.

The '3d_composition_page_id' field 720 indicates identification information about a composition page including subtitle data of a basic viewpoint subtitle forming a 3D subtitle.

The 'profile' field 730 indicates 3D subtitle type information about a current 3D subtitle. According to the semantic 770 of the 'profile' field 730, the current 3D subtitle may be determined to be a first subtitle type, which is formed based on basic viewpoint subtitle data (1 subtitle) and information about a distance (offset) between subtitles according to viewpoints, or a second subtitle type, which is formed based on the basic viewpoint subtitle data and additional viewpoint subtitle data (2 subtitle).

The 'corr_page_id' field 740 indicates identification information about a composition page including additional viewpoint subtitle data linked to a current basic viewpoint subtitle for forming the 3D subtitle.

The 'default_direction' field 750 may provide information about a distance between the basic viewpoint subtitle and the additional viewpoint subtitle required to form the 3D subtitle.

The 'default_direction' field 750 indicates a changing direction of a 3D effect as the basic viewpoint subtitle and the additional viewpoint subtitle recede or approach respectively on a basic viewpoint video screen and an additional viewpoint video screen in order to form the 3D subtitle. According to the semantic 780 of the 'default_direction' field 750, the direction may be a positive direction, wherein the 3D effect is generated so that a subtitle recedes from a viewer, or a negative direction, wherein the 3D effect is generated so that the subtitle approaches the viewer.

Also, the 'default_offset' field 760 indicates a location difference between the basic viewpoint subtitle and the additional viewpoint subtitle on a video screen to form the 3D subtitle.

Figure 8:
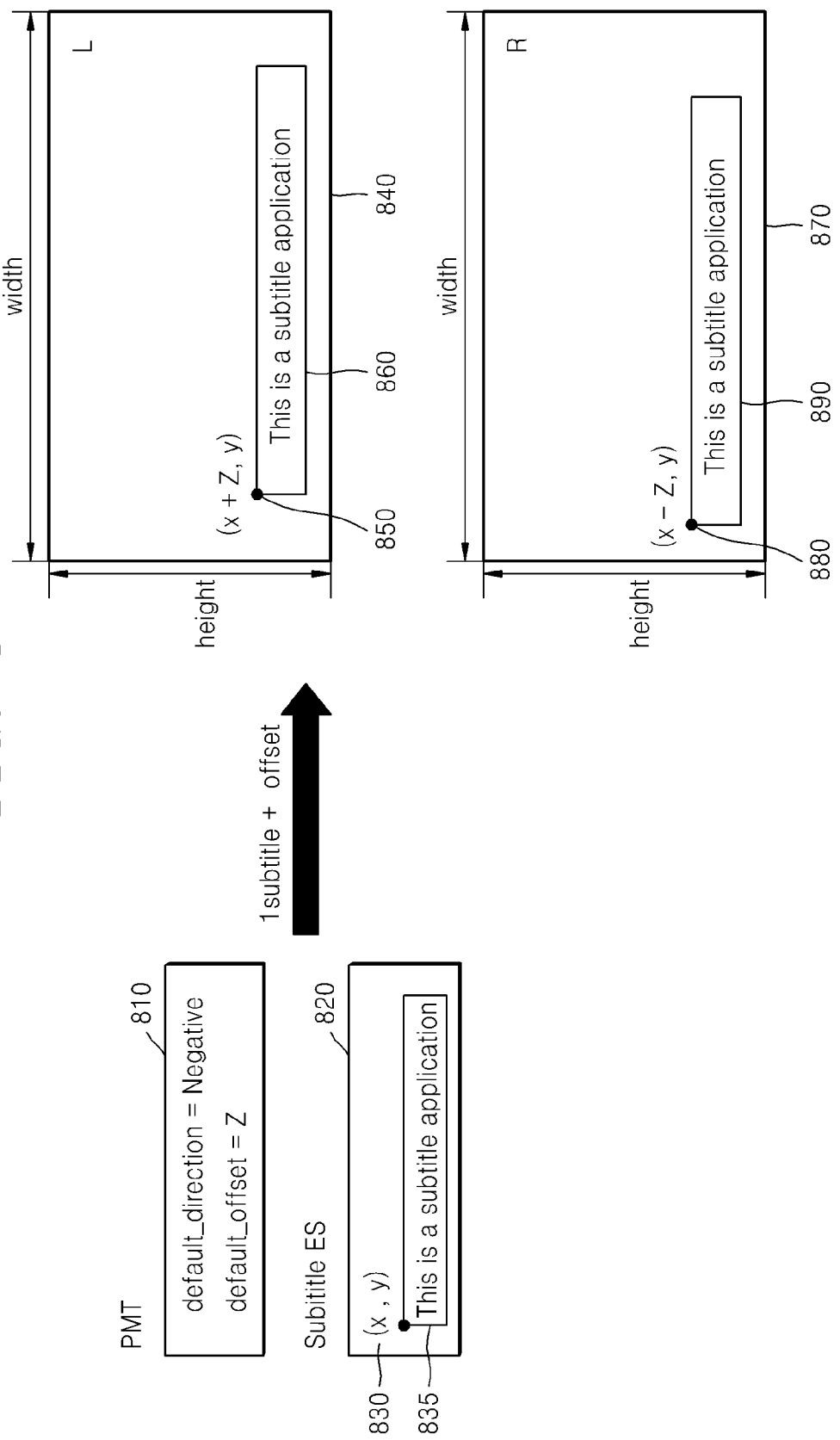
FIG. 8 shows a 3D subtitle formed by using basic viewpoint subtitle data, and distance information between a basic viewpoint subtitle and an additional viewpoint subtitle, according to an exemplary embodiment.

FIG. 8 shows a 3D subtitle formed by using basic viewpoint subtitle data, and information 810 about a distance between a basic viewpoint subtitle and an additional viewpoint subtitle, according to an exemplary embodiment.

The apparatus 200 as shown in FIG. 2 may extract the distance information 810 between the basic viewpoint subtitle and the additional viewpoint subtitle from a PMT section.

The apparatus 200 may obtain location information 830 (x, y) of a region 835 where text data of the text 'This is a subtitle application' of the basic viewpoint subtitle is displayed from a subtitle stream 820.

Also, the apparatus 200 may obtain information that a direction of a 3D effect of the 3D subtitle is negative and that a location difference of subtitles according to viewpoints is 'Z', based on the distance information 810.

The apparatus 200 may form a basic viewpoint subtitle reproduction screen 840 and an additional viewpoint subtitle reproduction screen 870 by using the location information 830, the text data, and the distance information 810.

In detail, in order to obtain the 3D effect in a negative direction, wherein the 3D subtitle protrudes to a viewer, the apparatus 200 moves a left viewpoint subtitle region on a left viewpoint video screen to right by the location difference Z from an initial location (x, y), and moves a right viewpoint subtitle region on a right viewpoint video screen to left by the location difference Z from the initial location (x, y).

Accordingly, the apparatus 200 may display a region 860 of the text 'This is a subtitle application' at a location 850 (x+Z, y) of the basic viewpoint subtitle reproduction screen 840.

Also, the apparatus 200 may display a region 890 of the text 'This is a subtitle application' at a location 880 (x−Z, y) of the additional viewpoint subtitle reproduction screen 870.

The apparatus 200 may determine that a current subtitle is a 3D subtitle according to a first subtitle type based on subtitle type information in a 3D subtitle descriptor of a PMT section, and then, reproduce the 3D subtitle according to the first subtitle type by extracting only the distance information 810, without having to detect page identification information about the additional viewpoint subtitle from the 3D subtitle descriptor.

Alternatively, if only the distance information 810 is extracted from the 3D subtitle descriptor of the PMT section regardless of the subtitle type information, the apparatus 200 may reproduce the 3D subtitle according to the first subtitle type by using the distance information 810.

Alternatively, if both the distance information 810 and the page identification information about the additional viewpoint subtitle are detected from the 3D subtitle descriptor of the PMT section regardless of the subtitle type information, the apparatus 200 may reproduce the 3D subtitle according to the first subtitle type by using the distance information 810 first.

Figure 9:
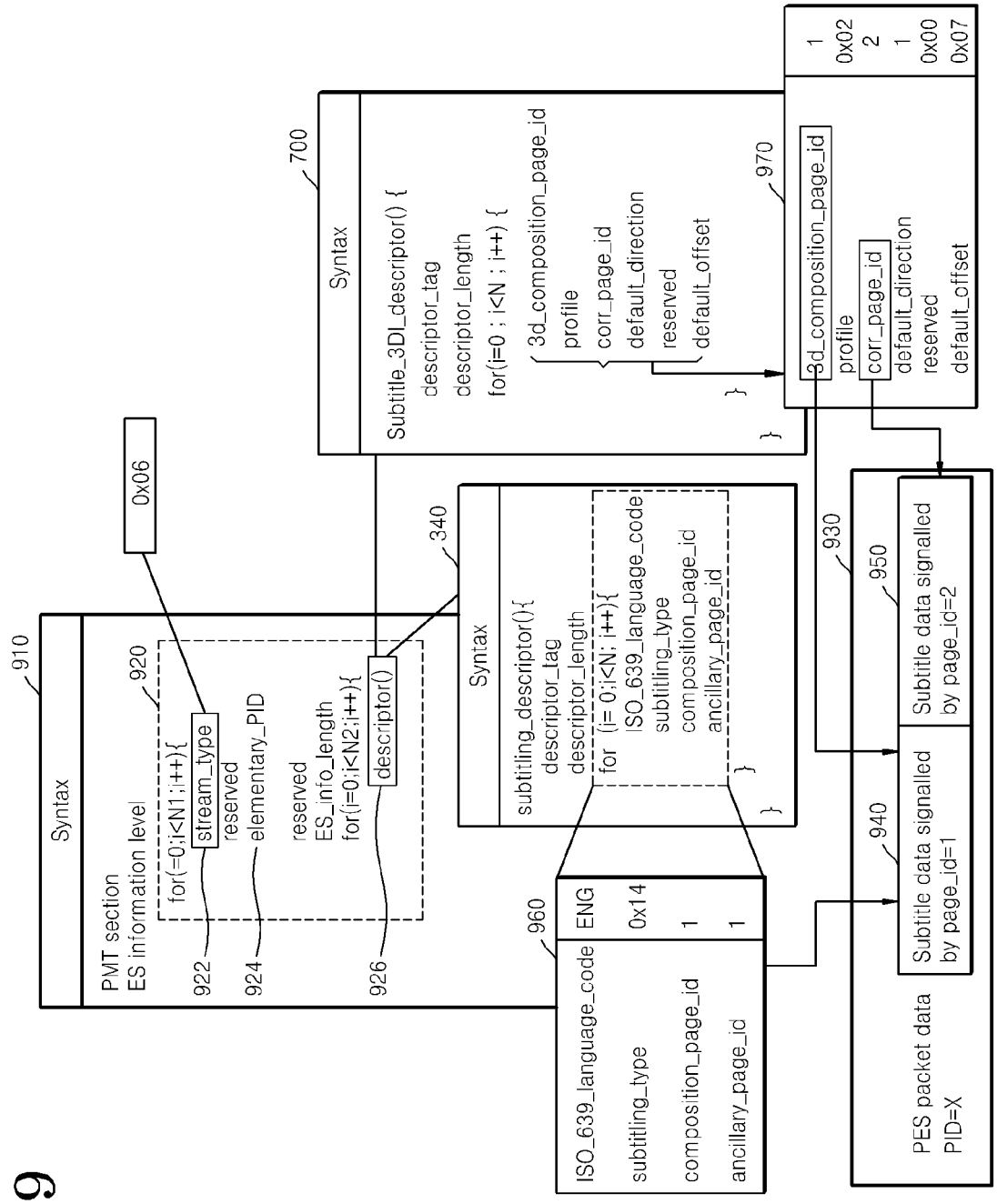
FIG. 9 shows a structure of a datastream including subtitle data according to viewpoints, and 3D subtitle reproduction information about the subtitle data according to viewpoints, according to an exemplary embodiment.

FIG. 9 shows a structure of a data stream including subtitle data according to viewpoints, and 3D subtitle reproduction information about the subtitle data according to viewpoints, according to an exemplary embodiment.

The apparatus 200 as shown in FIG. 2 may detect a PES packet 930, which includes private data and has an elementary stream identification information value of X, based on 'stream_type' 922 and 'elementary_PID' 924 from among information 920 about an elementary stream of a PMT section 910.

The apparatus 200 may detect the 'subtitling_descriptor( )' descriptor 340 from among a descriptor region 926 about the PES packet 930 of the PMT section 910. The apparatus 200 may extract subtitle data 940 including a composition page, in which a subtitle language is 'english' and a page identification information value is 1, from the PES packet 930, based on subtitle service information 960 from among the 'subtitling_descriptor' descriptor 340.

Also, the apparatus 200 may detect a 3D subtitle descriptor 'Subtitle_3DI_descriptor' 700, from among the descriptor region 926 about the PES packet 930 of the PMT section 910.

The apparatus 200 may extract basic viewpoint subtitle data 940 included in a composition page, in which a subtitle language is 'english' and a page identification information value is 1, from the PES packet 930, based on composition page identification information '3d_composition_page_id' from among 3D subtitle reproduction information 970 of the subtitle descriptor 'subtitling_descriptor' 700.

Also, the apparatus 200 may extract additional viewpoint subtitle data 950 included in a composition page, in which a page identification information value is 2, from the PES packet 930, based on related page identification information 'corr_page_id' from among the 3D subtitle reproduction information 970 of the subtitle descriptor 'subtitling_descriptor' 700.

The apparatus 200 may determine that a current subtitle is a 3D subtitle according to a second subtitle type based on the subtitle type information from among the 3D subtitle descriptor of the PMT section, and reproduce the 3D subtitle according to the second subtitle type by extracting only the page identification information about the additional viewpoint subtitle without having the detect the distance information 810 form the 3D subtitle descriptor.

Alternatively, if only the page identification information about the additional viewpoint is extracted from the 3D subtitle descriptor of the PMT section regardless of the subtitle type information, the apparatus 200 may reproduce the 3D subtitle according to the second subtitle type by using the page identification information about the additional viewpoint subtitle.

Alternatively, if both of the distance information 810 and the page identification information about the additional viewpoint subtitle are detected from the 3D subtitle descriptor of the PMT section, the apparatus 200 may reproduce the 3D subtitle according to the second subtitle type by using the page identification information about the additional viewpoint subtitle first.

As described with reference to FIG. 5, if the basic viewpoint subtitle data and the additional viewpoint subtitle data are received through different streams, the apparatus 200 may detect not only the page identification information about the additional viewpoint subtitle, but also the stream identification information about the additional viewpoint subtitle, from the 3D subtitle descriptor of the PMT section. Here, the apparatus 200 may detect a subtitle stream containing the additional viewpoint subtitle data, and detect a page containing the additional viewpoint subtitle data from the subtitle stream, by using the stream identification information and page identification information about the additional viewpoint subtitle.

Figure 10:
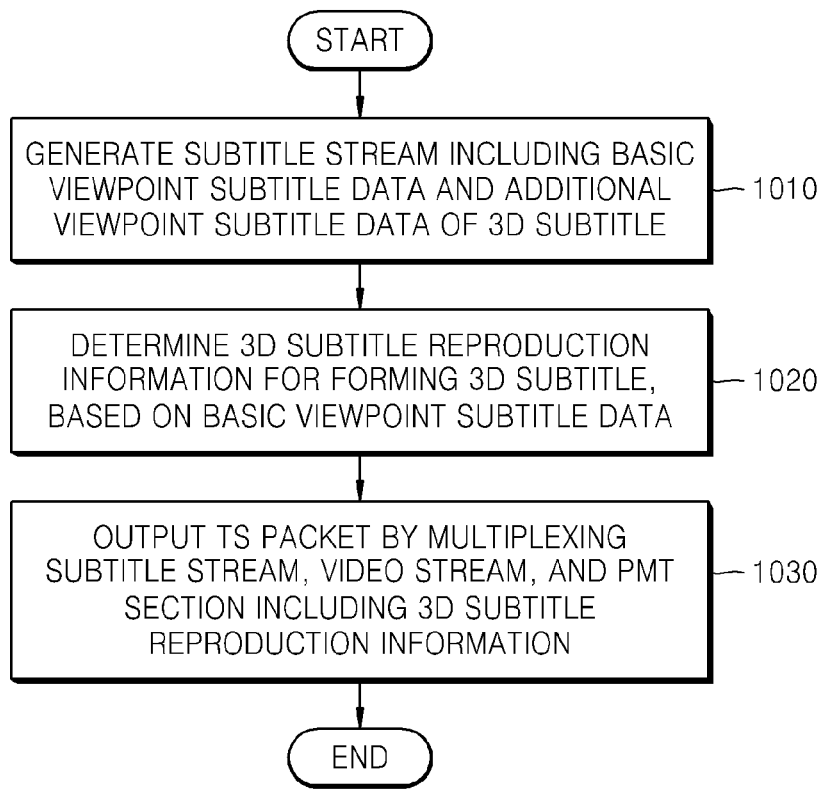
FIG. 10 is a flowchart illustrating a method of transmitting a video datastream, according to an exemplary embodiment.

FIG. 10 is a flowchart illustrating a method of transmitting a video data stream, according to an exemplary embodiment. The method according to the exemplary embodiment generates a video data stream for transmitting subtitle data with video data to provide a digital broadcasting service including a subtitle service with a video service.

In operation 1010, a subtitle stream including basic viewpoint subtitle data and additional viewpoint subtitle data may be generated to reproduce a subtitle in 3D on a video screen on which video data is reproduced.

The subtitle stream including both of the basic viewpoint subtitle data and the additional viewpoint subtitle data may be generated. Alternatively, a first subtitle stream including the basic viewpoint subtitle data and a second subtitle stream including the additional viewpoint subtitle data may be each generated.

Subtitle data may be identified by at least one subtitle page, and the basic viewpoint subtitle data and the additional viewpoint subtitle data may be identified by different subtitle pages.

In operation 1020, 3D subtitle reproduction information for forming a 3D subtitle on the video screen may be determined based on the basic viewpoint subtitle data.

The 3D subtitle reproduction information may include at least one of page identification information about the basic viewpoint subtitle data, 3D subtitle type information, page identification information about the additional viewpoint subtitle data, and information about a distance between the basic viewpoint subtitle and the additional viewpoint subtitle.

The 3D subtitle reproduction information may be transmitted in a descriptor form of the PMT section.

In operation 1030, a TS packet may be output by multiplexing a video stream including the video data, the subtitle stream and a PMT section including the 3D subtitle reproduction information.

FIG. 11 is a flowchart illustrating a method of receiving a video data stream, according to an exemplary embodiment. The method according to the exemplary embodiment receives a video data stream providing a digital broadcasting service. The video data stream includes both video data and subtitle data for providing a subtitle service with a video service.

In operation 1110, a video stream including video data, a subtitle stream, and a PMT section may be extracted by demultiplexing TS packets for providing a digital broadcasting service.

In operation 1120, basic viewpoint video data and additional viewpoint video data of a 3D video may be extracted from the video stream.

In operation 1130, the basic viewpoint subtitle data and the additional viewpoint subtitle data may be extracted from the subtitle stream to reproduce a subtitle in 3D on a video screen.

Both the basic viewpoint subtitle data and the additional viewpoint subtitle data may be extracted from one subtitle stream. Alternatively, the basic viewpoint subtitle data forming a first page, and the additional viewpoint subtitle data forming a second page may be extracted from different subtitle streams.

In operation 1140, 3D subtitle reproduction information for forming the 3D subtitle on the video screen may be extracted from the PMT section based on the basic viewpoint subtitle data.

Since the basic viewpoint subtitle data and the additional viewpoint subtitle data are identified by different subtitle pages according to an exemplary embodiment, the basic viewpoint subtitle data and the additional viewpoint subtitle data may be detected from the subtitle stream, based on subtitle page identification information from among the 3D subtitle reproduction information.

At least one of page identification information about the basic viewpoint subtitle data, 3D subtitle type information, page identification information about the additional viewpoint subtitle data, and information about a distance between subtitles according to viewpoints may be detected from the 3D subtitle reproduction information, according to an exemplary embodiment.

The 3D subtitle reproduction information may be extracted from a descriptor region of the PMT section, according to an exemplary embodiment.

In operation 1150, the basic viewpoint video data, the additional viewpoint video data, and the 3D subtitle may be composed and reproduced, based on the basic viewpoint subtitle data and the 3D subtitle reproduction information.

If a current 3D subtitle type is determined to be a first subtitle type based on the 3D subtitle type information, the basic viewpoint subtitle data may be composed with the additional viewpoint video data such that the basic viewpoint subtitle data is disposed at a location of the additional viewpoint subtitle data, by using the distance information from among the 3D subtitle reproduction information.

If the current 3D subtitle type is determined to be a second subtitle type based on the 3D subtitle type information, the additional viewpoint subtitle data corresponding to the basic viewpoint subtitle data may be detected based on the page identification information about the additional viewpoint subtitle data from among the 3D subtitle reproduction information, and the additional viewpoint subtitle data may be composed with the additional viewpoint video data.

Accordingly, the apparatus 100 as shown in FIG. 1 may include the basic viewpoint subtitle data and the additional viewpoint subtitle data for forming the 3D subtitle in the video data stream which includes 3D video data, and transmit the same, to provide the 3D video service according to a DVB method.

Also, the apparatus 100 may insert additional information indicating the additional viewpoint subtitle data corresponding to the basic viewpoint subtitle data, or additional information indicating a distance between the basic viewpoint subtitle and the additional viewpoint subtitle into the 3D video data stream and transmit the same, according to the DVB method.

Accordingly, the apparatus 200 as shown in FIG. 2 may extract 3D video data by receiving the video data stream according to the DVB method, and extract each of the basic viewpoint subtitle data and the additional viewpoint subtitle data for forming the 3D subtitle.

Also, the apparatus 200 may extract the additional information indicating the additional viewpoint subtitle data corresponding to the basic viewpoint subtitle data, or the additional information indicating the distance between the basic viewpoint subtitle and the additional viewpoint subtitle, from the 3D video data stream according to the DVB method.

The apparatus 200 may form a basic viewpoint video screen by composing the basic viewpoint subtitle data and the basic viewpoint video data, and an additional viewpoint video screen by composing the additional viewpoint subtitle data and the additional viewpoint video data, by using the extracted additional information, and realize a 3D video service providing a 3D subtitle service by alternately reproducing the basic viewpoint video screen and the additional viewpoint video screen.

Also, the apparatus 100 may provide the additional viewpoint subtitle data in the same data form as the basic viewpoint subtitle data, while providing the 3D subtitle reproduction information in a descriptor form that can be inserted into the PMT section according to the DVB method. Accordingly, lower compatibility may be guaranteed to reproduce a video by parsing and extracting information required for another video reproducing device even when a 3D video cannot be reproduced in the other video reproducing device or the other video reproducing device that does not support a 3D subtitle reproducing method receives the video data stream transmitted by the apparatus 100.

It would be interpreted by one of ordinary skill in the art that the block diagrams described in the above exemplary embodiments conceptually indicate a circuit for realizing the inventive concept. Similarly, it would be obvious to one of ordinary skill in the art that a predetermined flowchart, a flow graph, a state transition diagram, and a pseudo code are substantially expressed in a computer-readable recording medium and indicate various processes executed by a computer or a processor, even if the computer or processor is not explicitly shown. Accordingly, the exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The functions of various elements shown in diagrams may be provided by using not only hardware for executing software by being related to suitable software, but also exclusive hardware. When the functions are provided by a processor, the functions may be provided by a single exclusive processor, a single common processor, or a plurality of individual processor, wherein some processors are shared. Also, terms 'processor' or 'controller' shall not be interpreted to exclusively indicate hardware for executing software, and may unlimitedly and implicitly include digital signal processor (DSP) hardware, read-only memory (ROM) for storing software, random access memory (RAM), and nonvolatile storage device.

In claims, an element expressed as a unit for performing a certain function include a predetermined method of performing the certain function, and may include a combination of circuit elements for performing the certain function, or software in a predetermined form including firmware or microcode combined to a suitable circuit for executing software for performing the certain function.

In the present specification, 'an embodiment' and other modified expressions mean that a certain feature, structure, and characteristic are included in at least one exemplary embodiment. Accordingly, the expression "an embodiment" and other modified examples in the present specification may not denote the same embodiment.

In the present specification, the expression "at least one of A and B" is used to include a selection of only A, only B, or both A and B. Further, the expression "at least one of A through C" may be used to include a section of only A, only B, only C, only A and B, only B and C, or all of A through C. One of ordinary skill in the art would be able to clearly interpret the similar expression with more elements.

While the inventive concept has been particularly shown and described with reference to the above exemplary embodiments thereof, it will be understood by those of ordinary skill in the art that various changes in form and details may be made therein without departing from the spirit and scope of the inventive concept as defined by the appended claims. The above exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of transmitting a data stream for providing a digital broadcasting service, the method comprising:

generating a subtitle stream comprising basic viewpoint subtitle data to reproduce a three-dimensional (3D) subtitle with the basic viewpoint subtitle data and corresponding additional viewpoint subtitle data on a video screen on which video data is reproduced;

determining 3D subtitle reproduction information for forming the 3D subtitle on the video screen based on the basic viewpoint subtitle data; and outputting a data stream by multiplexing a video stream comprising the video data, the 3D subtitle reproduction information, and the subtitle stream, wherein the 3D subtitle reproduction information comprises 3D subtitle type information indicating a form of the 3D subtitle which is used to form the 3D subtitle based on the basic viewpoint subtitle data, wherein the 3D subtitle type information indicates one of a first subtitle type forming the 3D subtitle by using the basic viewpoint subtitle data and distance information, and a second subtitle type forming the 3D subtitle by using the basic viewpoint subtitle data and the additional viewpoint subtitle data, wherein the distance information indicates a distance between the basic viewpoint subtitle and the additional viewpoint subtitle for a plurality of dimensions, and comprises information about a direction of the distance between the basic viewpoint subtitle and the additional viewpoint subtitle, and wherein the 3D subtitle reproduction information comprises information indicating a reproduction priority from between the first subtitle type and the second subtitle type.

2. The method of claim 1, wherein the video stream further comprises a program map table (PMT) in which the 3D subtitle reproduction information is included.

3. The method of claim 2, wherein the determining the 3D subtitle reproduction information comprises inserting the 3D subtitle reproduction information into a descriptor region of the PMT.

4. The method of claim 1, wherein the subtitle data is identified by a subtitle page, and the basic viewpoint subtitle data and the additional viewpoint subtitle data are identified by different subtitle pages.

5. The method of claim 1, wherein the 3D subtitle reproduction information comprises page identification information about the basic viewpoint subtitle data.

6. The method of claim 5, wherein the 3D subtitle reproduction information further comprises at least one of page identification information about the additional viewpoint subtitle data corresponding to the basic viewpoint subtitle data, which forms the 3D subtitle together with the basic viewpoint subtitle data, and information about a distance between a basic viewpoint subtitle and an additional viewpoint subtitle on the video screen, in accordance with the 3D subtitle type information.

7. The method of claim 6, wherein the information about the distance between the basic viewpoint subtitle and the additional viewpoint subtitle comprises location difference information indicating at least one of a depth difference between the basic viewpoint subtitle and the additional viewpoint subtitle, a disparity difference, and an offset.

8. The method of claim 1, wherein, in the outputting the data stream, the data stream is output in a transport stream packet.

9. A method of receiving a data stream providing a digital broadcasting service, the method comprising:

extracting a video stream comprising video data, three-dimensional (3D) subtitle reproduction information, and a subtitle stream by demultiplexing the received data stream;

extracting basic viewpoint video data and additional viewpoint video data of a 3D video from the video stream; and extracting basic viewpoint subtitle data from the subtitle stream and determining basic viewpoint subtitle and additional viewpoint subtitle based on the basic viewpoint subtitle data and the 3D subtitle reproduction information to reproduce a 3D subtitle on a video screen on which the video data is reproduced, wherein the 3D subtitle reproduction information comprises 3D subtitle type information indicating a form of the 3D subtitle which is used to form the 3D subtitle based on the basic viewpoint subtitle data, wherein the 3D subtitle type information indicates one of a first subtitle type forming the 3D subtitle by using the basic viewpoint subtitle data and distance information, and a second subtitle type forming the 3D subtitle by using the basic viewpoint subtitle data and the additional viewpoint subtitle data, wherein the distance information indicates a distance between the basic viewpoint subtitle and the additional viewpoint subtitle for a plurality of dimensions, and comprises information about a direction of the distance between the basic viewpoint subtitle and the additional viewpoint subtitle, and wherein the 3D subtitle reproduction information comprises information indicating a reproduction priority from between the first subtitle type and the second subtitle type.

10. The method of claim 9, further comprising composing and reproducing the basic viewpoint video data, the additional viewpoint video data, and the 3D subtitle, based on the basic viewpoint subtitle data and the 3D subtitle reproduction information.

11. The method of claim 9, wherein the extracting the basic viewpoint subtitle data from the subtitle stream comprises detecting the basic viewpoint subtitle data by using a first subtitle page and detecting the additional viewpoint subtitle data by using a second subtitle page if the 3D subtitle type information indicates the second subtitle type.

12. The method of claim 9, wherein, the extracting the 3D subtitle reproduction information comprises extracting the 3D subtitle reproduction information from a program map table (PMT) included in the video stream.

13. The method of claim 9, wherein, if the 3D subtitle type information indicates the second subtitle type, the extracting the basic viewpoint subtitle data comprises:

extracting the basic viewpoint subtitle data forming a first page, from a first subtitle stream of the subtitle stream; and extracting the additional viewpoint subtitle data forming a second page, from a second subtitle stream of the subtitle stream.

14. The method of claim 9, wherein the extracting the 3D subtitle reproduction information comprises detecting page identification information about the basic viewpoint subtitle data from the 3D subtitle reproduction information.

15. The method of claim 9, wherein the extracting the 3D subtitle reproduction information further comprises detecting at least one of page identification information about the additional viewpoint subtitle data corresponding to the basic viewpoint subtitle data, which forms the 3D subtitle together with the basic viewpoint subtitle data, and information about a distance between a basic viewpoint subtitle and an additional viewpoint subtitle, from the 3D subtitle reproduction information in accordance with the 3D subtitle type information.

16. The method of claim 15, wherein the extracting the 3D subtitle reproduction information further comprises detecting information about a location difference indicating at least one of a depth difference between the basic viewpoint subtitle and the additional viewpoint subtitle, a disparity difference, and an offset, from the distance information between the basic viewpoint subtitle and the additional viewpoint subtitle.

17. The method of claim 12, wherein the extracting the 3D subtitle reproduction information comprises extracting the 3D subtitle reproduction information from a descriptor region of the PMT.

18. The method of claim 15, further comprising, if the current 3D subtitle type is determined to be the first subtitle type:
composing the basic viewpoint subtitle data with the basic viewpoint video data; and
composing the basic viewpoint subtitle data with the additional viewpoint video data such that the basic viewpoint subtitle data is disposed at a location of the additional viewpoint subtitle data, by using the distance information.

19. The method of claim 15, further comprising, if the current 3D subtitle type is determined to be the second subtitle type:
composing the basic viewpoint subtitle data with the basic viewpoint video data; and
detecting the additional viewpoint subtitle data corresponding to the basic viewpoint subtitle data based on the page identification information about the additional viewpoint subtitle data from among the 3D subtitle reproduction information, and composing the additional viewpoint subtitle data with the additional viewpoint video data.

20. An apparatus for transmitting a data stream for providing a digital broadcasting service, the apparatus comprising:
a subtitle stream generator which generates a subtitle stream comprising basic viewpoint subtitle data to reproduce a three-dimensional (3D) subtitle with the basic viewpoint subtitle data and corresponding additional viewpoint subtitle data on a video screen on which video data is reproduced;
a 3D subtitle reproduction information determiner which determines 3D subtitle reproduction information for forming the 3D subtitle on the video screen based on the form of the 3D basic viewpoint subtitle data; and
an output unit which outputs a data stream by multiplexing a video stream comprising the video data, the 3D subtitle reproduction information, and the subtitle stream,
wherein the 3D subtitle reproduction information comprises 3D subtitle type information indicating a form of the 3D subtitle which is used to form the 3D subtitle based on the basic viewpoint subtitle data,
wherein the 3D subtitle type information indicates one of a first subtitle type forming the 3D subtitle by using the basic viewpoint subtitle data and [[a]] distance information, and a second subtitle type forming the 3D subtitle by using the basic viewpoint subtitle data and the additional viewpoint subtitle data,
wherein the distance information indicates a distance between the basic viewpoint subtitle and the additional viewpoint subtitle for a plurality of dimensions, and comprises information about a direction of the distance between the basic viewpoint subtitle and the additional viewpoint subtitle, and
wherein the 3D subtitle reproduction information comprises information indicating a reproduction priority form between the first subtitle type and the second subtitle type.

21. An apparatus for receiving a data stream providing a digital broadcasting service, the apparatus comprising:
a receiver which extracts a video stream comprising video data, three-dimensional (3D) subtitle reproduction information, and a subtitle stream by demultiplexing a received data stream;
a video data extractor which extracts basic viewpoint video data and additional viewpoint video data of a 3D video from the video stream; and
a subtitle data extractor which extracts basic viewpoint subtitle data from the subtitle stream, and determines basic viewpoint subtitle and additional viewpoint subtitle based on the basic viewpoint subtitle data and the 3D subtitle reproduction information so that a 3D subtitle is reproduced on a video screen on which the video data is reproduced;
wherein the 3D subtitle reproduction information comprises 3D subtitle type information indicating a form of the 3D subtitle which is used to form the 3D subtitle based on the basic viewpoint subtitle data,
wherein the 3D subtitle type information indicates one of a first subtitle type forming the 3D subtitle by using the basic viewpoint subtitle data and distance information, and a second subtitle type forming the 3D subtitle by using the basic viewpoint subtitle data and the additional viewpoint subtitle data,
wherein the distance information indicates a distance between the basic viewpoint subtitle and the additional viewpoint subtitle for a plurality of dimensions, and comprises information about a direction of the distance between the basic viewpoint subtitle and the additional viewpoint subtitle, and
wherein the 3D subtitle reproduction information comprises information indicating a reproduction priority from between the first subtitle type and the second subtitle type.

22. The apparatus of claim 21, further comprising a reproducer which composes and reproduces the basic viewpoint video data, the additional viewpoint video data, and the 3D subtitle, based on the basic viewpoint subtitle data and the 3D subtitle reproduction information.

23. The apparatus of claim 21, further comprising the 3D subtitle reproduction information extractor which extracts the 3D subtitle reproduction information from a program map table (PMT) included in the video stream.

24. A non-transitory computer readable recording medium having recorded thereon a program for executing the method of claim 1.

25. A non-transitory computer readable recording medium having recorded thereon a program for executing the method of claim 9.

26. The method of claim 1, wherein the form of the 3D subtitle is switchable between the first subtitle forming type and the second subtitle forming type.

27. The method of claim 1, wherein the 3D subtitle type information indicates both the first subtitle type forming the 3D subtitle and the second subtitle type forming the 3D subtitle.

28. The method of claim 1, wherein the distance information includes at least two from among a depth difference, a disparity difference, and an offset of the basic viewpoint subtitle data.

* * * * *